(12) United States Patent
Noldus et al.

(10) Patent No.: US 8,223,937 B2
(45) Date of Patent: Jul. 17, 2012

(54) METHOD OF AND SWITCHING DEVICE FOR HANDLING A TELEPHONE CALL INITIATED FROM A CALLING TERMINAL IN A CIRCUIT SWITCHED TELECOMMUNICATIONS NETWORK

(75) Inventors: Rogier Noldus, BM Goirle (NL); Jos den Hartog, SE Capelle a/d Ijssel (NL); Rakesh Taori, Suwon (SK)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 996 days.

(21) Appl. No.: 11/915,784

(22) PCT Filed: May 31, 2005

(86) PCT No.: PCT/EP2005/005904
§ 371 (c)(1),
(2), (4) Date: Jan. 4, 2008

(87) PCT Pub. No.: WO2006/128485
PCT Pub. Date: Dec. 7, 2006

(65) Prior Publication Data
US 2008/0198990 A1   Aug. 21, 2008

(51) Int. Cl.
*H04M 1/56* (2006.01)
(52) U.S. Cl. ......... 379/142.04; 379/142.05; 379/142.06; 379/142.07; 379/207.14; 379/245

(58) Field of Classification Search ............. 379/207.02, 379/121.02, 88.19, 142.01, 142.06, 142.1, 379/151; 370/352, 357
See application file for complete search history.

(56) References Cited

U.S. PATENT DOCUMENTS

| | | | |
|---|---|---|---|
| 2002/0196913 A1* | 12/2002 | Ruckart | 379/88.19 |
| 2004/0052351 A1* | 3/2004 | Urban et al. | 379/207.02 |
| 2004/0258230 A1* | 12/2004 | Hanna | 379/121.02 |
| 2005/0025137 A1* | 2/2005 | Madoch et al. | 370/357 |
| 2006/0056610 A1* | 3/2006 | Urban et al. | 379/142.01 |
| 2006/0146793 A1* | 7/2006 | Benco et al. | 370/352 |
| 2006/0147010 A1* | 7/2006 | Batni et al. | 379/202.01 |
| 2006/0147023 A1* | 7/2006 | Croak et al. | 379/221.11 |

FOREIGN PATENT DOCUMENTS
WO  WO 2004/103012 A  11/2004
* cited by examiner

*Primary Examiner* — Joseph J Nguyen

(57) ABSTRACT

The invention relates to a method of handling a telephone call initiated from a calling terminal in a circuit switched telecommunications network by providing called party identification data of a called party to said network. In the method proposed said call is set up by obtaining answering party identification data from a service control point associated with said called party based on said provided called party identification data. Communication is provided through said network between said calling terminal and an answering terminal identified using said answering party identification data. Said answering party identification data is made available to at least one service control point in said network for identifying services associated with said answering terminal. The invention further relates to a switching device for use with said method.

18 Claims, 2 Drawing Sheets

METHOD OF AND SWITCHING DEVICE FOR HANDLING A TELEPHONE CALL INITIATED FROM A CALLING TERMINAL IN A CIRCUIT SWITCHED TELECOMMUNICATIONS NETWORK

FIELD OF THE INVENTION

The present invention relates to a method of handling a telephone call initiated from a calling terminal in a circuit switched telecommunications network by providing called party identification data of a called party to said network, wherein said call is set up by obtaining answering party identification data from a network entity associated with said called party based on said provided called party identification data and by providing communication through said network between said calling terminal and an answering terminal identified using said answering party identification data.

The invention further relates to a switching device for use with a method according any of the previous claims.

BACKGROUND OF THE INVENTION

The number of value added services that can be delivered in circuit switched networks, such as fixed and mobile networks, is increasing fastly as a result of, amongst others, the booming mobile telecommunications market. Developments such as the rolling out of UMTS over the past years enable the use of for example mobile phones for a large number of services such as regular voice calls, mobile broadband internet services, short messaging service (SMS), multimedia messaging service (MMS), but also numerous different charging schemes, security related services such as number dependent blocking of telephone calls, etc.

The services available are often dependent on the terminal or communication device used for accessing the telecommunication network. As an example, one may consider a telecommunication device which is restricted in use on the network, in that only telephone numbers in a specific area may be called using that communication device. Another example is the availability of multimedia service capabilities of a communication device, enabling the user thereof e.g. to receive MMS-messages.

Call forwarding is another of these value added services, which is widely used in circuit switched telecommunication networks. If for example party A is trying to reach party B, while party B is not able to pick up the phone due to e.g. absence, party B may have instructed the network to forward all incoming calls on his home telephone number to the phone of a friend, party C, where B can be temporarily reached. Although this service has increased the reachability of users of a telecommunication network a great deal, services such as call forwarding also provide new problems and challenges to overcome within the telecommunications industry.

A disadvantage of call forwarding is that party A may not aware of the forwarding of the call to party C, and of the service level that can be provided to party C and/or the terminal used by party C. In general, party A may not know that he is connected to party C, and as a result or in addition, may not be aware of the value added services available to party C.

It is noted that call forwarding is triggered by the switching device to which party B (i.e. his terminal unit) is connected on the circuit switched telecommunication network. Upon receiving an incoming call for party B, the mobile switching centre (MSC) (being a gateway MSC or visiting MSC) to which party B is connected, consults the service control point (SCP) or the home location register (HLR) with which this is associated and finds a call forwarding to party C. It thereupon forwards the call to an MSC (or local exchange in a wireline network) to which party C is connected, for delivering the call.

When the call is answered, the integrated services digital network (ISDN) user part (ISUP) or bearer independent call control (BICC) may provide an indication of the connected number (party C) to party A's terminal, however this will merely provide the connected number to party A. This will not be sufficient for A to determine the service level available to C, nor does the sending of this information provide a possibility to invoke further services.

SUMMARY OF THE INVENTION

It is an object of the present invention to provide a method of handling a telephone call in a circuit switched telecommunication network, which enables identification and/or invocation of services available to or associated with a connected party.

This and other objects of the present invention are achieved in that there is provided a method of handling a telephone call initiated from a calling terminal in a circuit switched telecommunications network by providing called party identification data of a called party to said network, wherein said call is set up by obtaining answering party identification data from a network entity associated with said called party based on said provided called party identification data and by providing communication through said network between said calling terminal and an answering terminal identified using said answering party identification data, and wherein said answering party identification data is made available to at least one service control point in said network for identifying services associated with said answering terminal.

The invention is based on the insight that by making available the answering party identification data to service control points in other parts of the network (parts that are not involved in the call forwarding, such as an originating service control point if calling party and called party are served from different MSCs or SCPs), services can be invoked by these service control points. These services can be invoked from the at least one service control point which was made aware of the answering party identification data.

In a conventional circuit switched telecommunications system, this is not possible; services may only be invoked at the terminating side or by the service control point that performs the call forwarding.

In relation to the above it is noted that the network entity for obtaining answering party identification data will be most often be a service control point or home location register connected to or associated with the mobile switching centre (MSC) associated with or serving the calling party. The information may however be obtained from another network entity suitable for this purpose.

In accordance with an embodiment of the invention, said answering party identification data is made available by a terminating switching device to which said answering terminal is connected.

Note that said terminating switching device usually sends an answer notification to the terminal of the calling party, using the virtual circuit reserved in the circuit switched network for providing communication. An example of such a message is the answer message (ANM) provided in the integrated services digital network (ISDN) user part (ISUP) signalling protocol. This message is sent to the calling party's terminal unit and passes all intermediate switching devices in between the calling party and the answering party. The ANM message may be read by any of these switching devices, and information enclosed in this message may be forwarded by any of the intermediate switching devices to an associated service control point. Said answering party identification data may therefore, according to another embodiment, be made available upon answering of said call by said answering terminal.

According to a further embodiment of the invention, said answering party identification data is made available by including said answering party identification data in a message. This message may in particular comprise at least one of a group comprising unstructured supplementary service data (USSD) message, or a signalling message, such as customized application for mobile network enhanced logic (CAMEL) application part (CAP) message, intelligent network application part (INAP) message, mobile application part (MAP) message, and messages having formats derived from these. The above are suitable and/or commonly used message formats for exchanging information between switching devices and service control points.

A preferred embodiment of the invention proposes that said calling terminal is operatively connected to an originating switching device, and said at least one service control point is connected to said originating switching device; i.e. said at least one service control point is an originating service control point associated with the mobile switching centre (MSC) to which the calling party is connected.

The invocation of services by the calling party is commonly handled by the service control point connected to or associated with the originating MSC to which said calling party is connected. Therefore, by providing said information to said service control point associated with the originating MSC enables the invocation of value added services by the calling party.

Said at least one service control point may however comprise a service control point connected to an intermediate switching device used for establishing said call, such as a service control point connected to or associated with a transit network node or a gateway network node.

It is noted that the provisioning of the answering party identification data to a service control point associated with an intermediate switching device also provides benefits, in that it enables e.g. a network operator to invoke certain services. These services invoked by the network operator may be directly provided to users of the telecommunications system, or may comprise services provided amongst network operators, such as special charging schemes for traffic using certain interconnecting points between different networks.

In accordance with another embodiment of the invention, said method further comprises a step of providing at least one of said identified services associated with said answering terminal. Said identified service may, for example be provided through said at least one service control point.

Based on said answering party identification data, in yet a further embodiment of the invention, additional answering party identification data is made available to said at least one service control point.

This is in particular useful in combination with e.g. a virtual private network (VPN) service, wherein a terminal from a user may be identifiable on the circuit switched telecommunications network using an identification number (phone number), whilst being identifiable on a virtual private network (VPN) amongst the users of that VPN service using a different identification number (e.g. a short version of the phone number).

In accordance with a second aspect of the invention there is provided a switching device for use with a method according to any of the previous claims, comprising means for receiving answering party identification data from a service control point associated with a called party during set-up of a call originating from a calling party, and for forwarding said answering party identification data to a service control point connected to said switching device for identifying services associated with an answering terminal identified by said answering party identification data.

The present invention will now be further elucidated by a description and drawings referring to a preferred embodiment thereof. It is noted that although the invention has been mainly described in relation to a mobile circuit switched network (with respect to the references to mobile switching centres), it may as well be applied to fixed or wireline circuit switched telecommunications networks (in this respect it is noted that in a wireline network, the switching devices are generally referred to as local exchanges). The invention is thus not limited to the embodiments disclosed, which are provided for explanatory purposes only, however the scope of the invention is only limited by the appended claims.

DETAILED DESCRIPTION OF THE DRAWINGS

Figure 1:
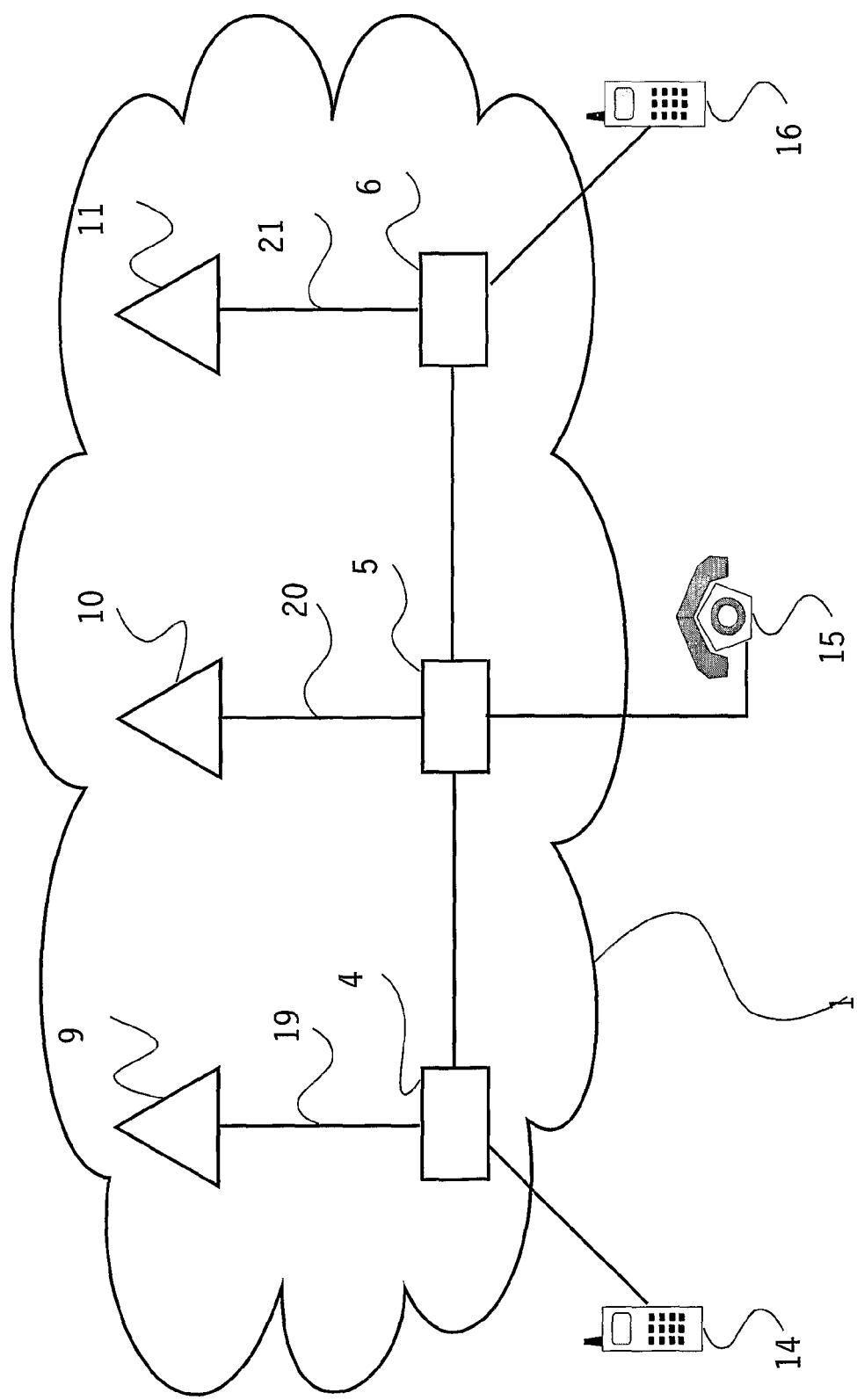
FIG. 1 schematically illustrates a circuit switched telecommunications network suitable for applying the method of the present invention.

Circuit switched calls in a circuit switched telecommunications network may be subject to value added services (VAS), which may be offered through, amongst others, intelligent network (IN) and in a combinational network (circuit switched (CS) and packet switched (PS)) session initiation protocol (SIP). The application of intelligent network (IN) functions to a circuit switched circuit switched telecommunications network entails the use of intelligent network application apart (INAP) type control relationships between network elements of the network. Such INAP type control relationships involve CS1+ and customized application for mobile network enhanced logic (CAMEL).

When CAMEL or CS1+ is used to control a call, the called party number is reported to the service control point (SCP) associated with the mobile switching centre (MSC) to which the terminal of the calling party is (at least momentarily) connected. It is noted that in a mobile telecommunications network, the mobile switching centre being in connection with the calling party may vary dependent on the location of the user.

The service control point (SCP) has the capability to allow the call to continue with a modified called party number (e.g. in case of virtual private networking (VPN)), or to allow the call to continue to the original called party number. The service control point (SCP) is always aware of the intended destination of the call.

If, however the called party makes use of call forwarding service, the service control point (SCP) associated with the MSC to which the called party is (temporarily) connected, modifies the called number and may forward the call to a different terminal or another MSC. In this case, the original service control point (SCP) connected to the main switching center (MSC) to which the calling party is connected, is not aware of this modification of the called party, and as a result will not be able to identify the service level available to the answering party of the telephone.

The above provides a particular disadvantage for the provisioning of some type of value added services, e.g. combinational services. A combinational service may for example enable a user to simultaneously use packet switched (PS) services in addition to circuit switch (CS) services. A calling party may, for instance during a phone call, send graphics or pictures to the party presently answering the call. If the originating service control point is not aware of the service level at the terminal of the answering party, the service control point (SCP) will assume that such combinational services are not possible to provide to the answering party.

Another example of a service which is affected by call forwarding is in-call charge reversal. In this case, it is not the calling party which is charged for a call, but the answering party. In order to enable charge reversal, the originating service control point (SCP) needs to communicate with the answering party in order to receive authorization from the answering party for reversing the charging of the call. The originating service control point (SCP) therefore needs to know the answering party identification data or telephone number of the answering party in order to enable this service.

FIG. 1 shows a regular telecommunications network 1, wherein a plurality of main switching centers (MSC's) 4, 5 and 6 are interconnected in the network. Each of the MSC's 4, 5, 6 is connected to an associated service control point (SCP): SCP 9, SCP 10 and SCP 11 respectively. In FIG. 1, the connections between each of the MSC's 4, 5 and 6 and the service control points 9, 10 and 11 is indicated by the straight lines 19, 20 and 21 as if there is a direct connection. It will often be the case that the communication between the MSC and SCP will be controlled by a service switching point (SSP), however, such an SSP is not included in FIG. 1 for clarity purposes.

A first party having a mobile terminal 14 is operatively connected to MSC 4. A second party having terminal 15 is operatively connected to MSC 5. And a third party having mobile terminal 16 is operatively connected to MSC 6. Here, it will be assumed that the second party using terminal 15, is making use of a call forwarding service such that all calls to terminal 15 are redirected to mobile terminal 16.

Mobile terminals 14 and 16 are both smart phones enabling use of both circuit switched and packet switched services to the users thereof. Terminal 15 is a regular landline telephone enabling only regular circuit switched services such as making voice phone calls, call forwarding, voice mail, etc.

Hereinbelow, it will be assumed that a first user using mobile terminal 14 is a photographer which wants to notify a customer using a landline telephone 15 that has digital photo's have been developed and a CD-ROM is ready for him to pick up in the store. The customer using a landline telephone 15 is however on a business trip, and has his landline telephone 15 redirected to his mobile telephone 16. It is noted that mobile terminal 16 is a dual transfer mode (DTM) phone, therefore the digital photo's that have been developed by the photographer which is making the call via terminal 14, may optionally be sent over the Internet to smart phone 16 if the customer so desires.

Figure 2:
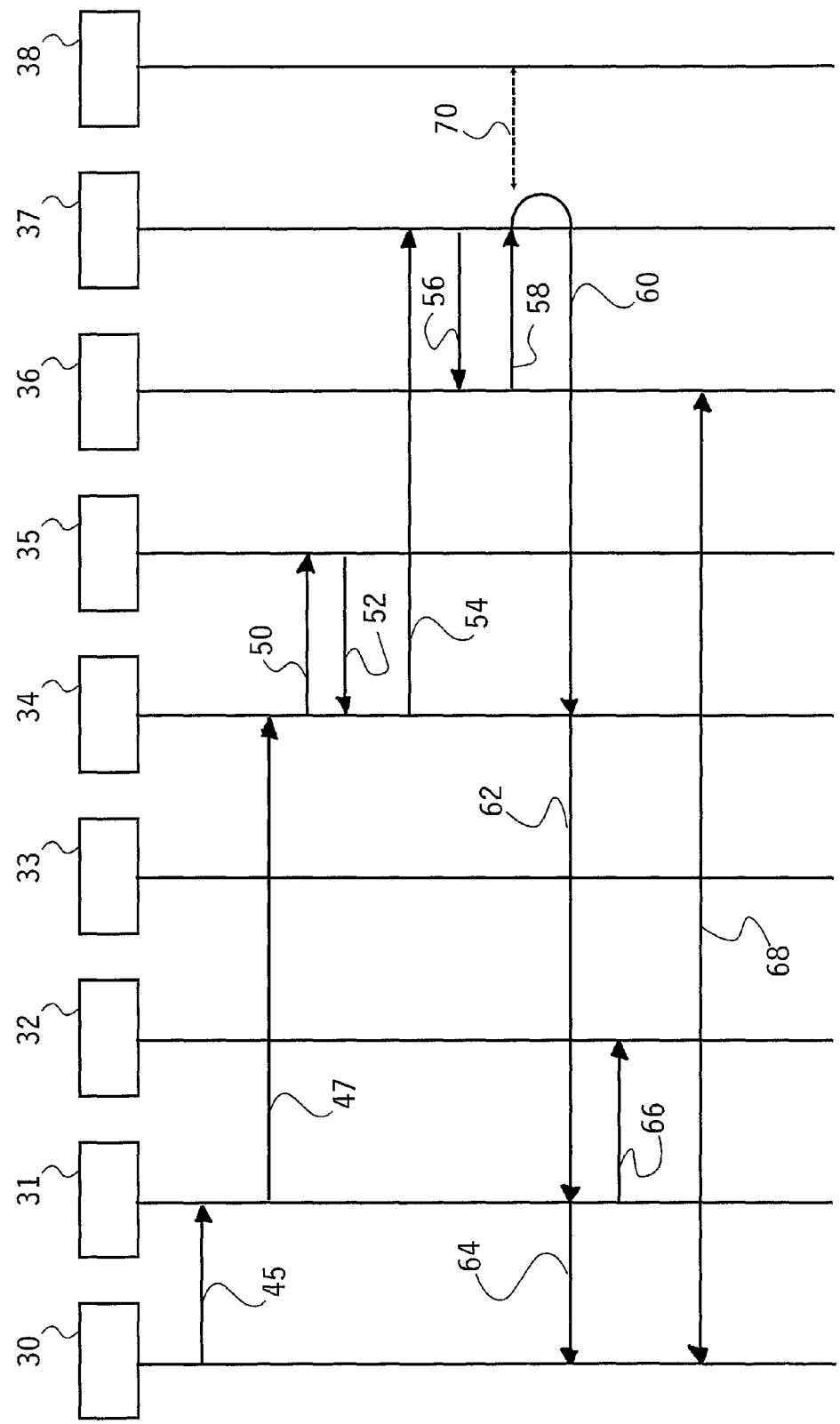
FIG. 2 shows a diagram which schematically indicates communication between different elements of a circuit switched telecommunications network, as the network of FIG. 1.

FIG. 2 shows a diagram, wherein communication between the different element of FIG. 1 is schematically indicated by arrows. Boxes 30, 31, 32, 33, 34, 35, 36, 37 and 38 indicate the elements of FIG. 1. The steps to be carried out for setting up a phone call between the different terminals of FIG. 1 are, consecutively in time, shown in FIG. 2 from top to bottom.

Terminal 14 in FIG. 1 is indicated by box 30 in FIG. 2, likewise, MSC 4 is indicated by box 31, SCP 9 is indicated by box 32, terminal 15 is indicated by box 33, MSC 5 is indicated by box 34, SCP 10 is indicated by box 35, terminal 16 is indicated by box 36, MSC 6 is indicated by box 37 and SCP 11 is indicated by box 38.

As soon as the calling party has keyed in the identification number (phone number) of the called party (terminal 15), this identification number is forwarded to the MSC 4 to which terminal 14 is connected, as is indicated by step 45. The MSC 4, upon receiving the called party number, will contact MSC 5 (step 47) in order to reserve a communication channel. MSC 5 double checks its associated service control point 10 (step 50) in order to find out whether there any value added services used by terminal 15. Service control point 10 will forward a redirection telephone number (step 52) to which all calls to terminal 15 are forwarded using the call forwarding service.

Upon receiving this redirection telephone number from the SCP 10, MSC 5 will contact MSC 6 (near terminal 16) in order to reserve a communication channel (step 54). MSC 6 will contact terminal 16 to indicate an incoming phone call (step 56).

Terminal 16 starts ringing, and is answered by the receiving user. Upon answering, terminal 16 forwards an answer message (step 58) to MSC 6, which forwards the answer message consecutively to MSC 5 (step 60), MSC 4 (step 62) and from there to terminal 14. Terminal 14 is then notified of the fact that it is connected to terminal 16 instead of terminal 15.

In accordance with the method of the present invention, SCP 9 is notified of the answering party identification number (equalling the redirection telephone number). This notification is performed by sending an additional signalling message (step 66) from MSC 4 to SCP 9. This additional signalling message may comprise any of a group comprising CAMEL application part (CAP) messages, intelligent network application part (INAP) messages, mobile application part (MAP) messages or unstructured supplementary service data (USSD) messages. It will be understood that any other format suitable for communicating data between an MSC and an SCP may be used for notifying SCP 9 of the actual connected number.

The message comprising the answering party identification data, retrieves this information from the ANM message sent in accordance with the ISUP signalling protocol. The ANM message is received by each of the intermediate MSCs as a regular signalling message under ISUP, and the information in the ANM message is therefore available in these MSCs. The MSC therefor merely needs to interpret the ANM message and transfer the required information (in particular the answering party identification data) in the message to be sent to the service control point associated with the MSC.

The message may be a dedicated message, having notification of the service control point of the actual connected number (the answering party identification data) as its special purpose. However, the information may be included in an existing signalling message exchanged between the MSC and it's associated service control point (SCP). Such a regular existing message is, for instance, the event report BCSM (ERB) CAP or CS1+ operation (note that BCSM in this context refers to basic call state model (BCSM)).

Upon receiving the ANM message by terminal 14, the connection is established and communication between terminal 14 and terminal 16 may take place (step 68).

Since SCP 9 is made aware of the actual connected number or answering part identification data, additional services such as packet switched services can be performed between terminal 14 and terminal 16, which are both dual transfer mode (DTM) phones capable to have sessions on networks of different types (circuit switched (CS) and packet switched (PS))

simultaneously. In this particular case, the photographer using terminal 14 may send the developed pictures through a packet switched service from terminal 14 to terminal 16.

It is noted that the diagram of FIG. 2 only indicates steps that may be necessary for setting up the phone call between terminal 14 and (eventually) terminal 16. It may be the case (it usually is the case) that upon reserving a channel between MSC 5 and MSC 6 (step 54) and before terminal 16 is notified of the incoming phone call (step 56), MSC 6 double checks the use of a call forwarding service or any other value added service by terminal 15 with service control point 11 associated with MSC 6. This additional step is not shown in FIG. 2 in order to reduce the complexity thereof and in order to increase intelligibility of FIG. 2.

It is further noted that upon receiving the answering message by MSC 6 (step 58), MSC 6 checks with SCP 11 whether or not terminal 14 may be part of the same virtual private network as terminal 16, and whether or not an additional connected number (comprising e.g. the short telephone number within the VPN network of terminal 16) should be included in the ANN message. The checking of SCP 11 for this purpose is indicated by step 70 in FIG. 2 (dotted lined arrow).

It will be appreciated that in addition to the answering party identification data, other information may be forwarded to the service control point 9 associated with MSC 4 in a similar manner. The inclusion of additional information may increase applicability of the method of the present invention.

Also, in the example given above, the information is forwarded to SCP 9. It is however noted that other SCP's (if any) associated with MSCs along the circuit reserved for the call, may be notified on the basis of an ANM message or triggered by another type of message exchanged between the different elements of the network involved in the communication.

Also, the invention is not restricted to interpreting ANM messages for finding answering party identification data. This data may be acquired differently, using e.g. other type of signalling messages.

It will be appreciated that the setting up of a service may involve additional, or other steps than the steps indicated in FIG. 2. It is in particular noted that the method of the present invention is directed to providing the answering identification data to another service control point in the circuit switched telecommunications network, other than the service control point taking care of the call forwarding and the service control point associated with the MSC which terminates the call. The method indicated in the diagram of FIG. 2 is merely indicative for such a method. The embodiments described and the steps involved as described in FIG. 2, are not intended to be limitative for the present invention, but merely provide an example of an embodiment thereof. The scope of the invention is only limited by the appended claims.

The invention claimed is:

1. A method of handling a telephone call initiated from a calling terminal in a circuit switched telecommunications network, the method comprising:
    providing identification data of a called party to said circuit switched telecommunications network, wherein said telephone call is set up by obtaining answering party identification data, comprising a redirection number, from a network entity associated with said called party and based on said provided called party identification data and by
    providing communication through said network between said calling terminal and an answering terminal identified using said answering party identification data, said answering party identification data being obtained from an answer notification message, and
    making said answering party identification data available, by including said answering party identification data in a signaling message, to a service control point (SCP) associated with said network entity in said network for identifying services associated with said answering terminal.

2. The method according to claim 1, wherein said answering party identification data is made available by a terminating switching device to which said answering terminal is connected.

3. The method according to claim 2, wherein said answering party identification data is made available upon answering of said call by said answering terminal.

4. The method according to claim 1, wherein said signaling message is at least one of a group comprising customized application for mobile network enhanced logic (CAMEL) application part (CAP) message, intelligent network application part (INAP) message, mobile application part (MAP) message, unstructured supplementary service data (USSD) message, and messages having formats derived from these.

5. The method according to claim 1, wherein said calling terminal is operatively connected to an originating switching device, and wherein said at least one service control point is connected to said originating switching device.

6. The method according to claim 1, wherein said at least one service control point is connected to an intermediate switching device used for establishing said call.

7. The method according to claim 1, further comprising a step of providing at least one of said identified services associated with said answering terminal.

8. The method according to claim 7, wherein said identified service is provided through said at least one service control point (SCP).

9. The method according to claim 1, making additional answering party identification data available to said at least one service control point, based on said answering party identification data.

10. A switching device for handling a telephone call initiated from a calling terminal in a circuit switched telecommunications network, the switching device comprising a processor and a memory storing instructions that, when executed cause the switching device to:
    receive answering party identification data, comprising a redirection number, from a network entity associated with a called party, during set-up of a call originating from a calling party, said answering party identification data being from an answer notification message, and
    forward and make said answering party identification data, by including said answering party identification data in a signaling message, available to a service control point (SCP) connected to said switching device by including said answering party identification data in said signaling message for identifying services associated with an answering terminal identified by said answering party identification data.

11. The switching device according to claim 10, wherein said message is in a group comprising customized application for mobile network enhanced logic (CAMEL) application part (CAP) message, intelligent network application part (INAP) message, mobile application part (MAP) message, unstructured supplementary service data (USSD) message, and messages having formats derived from these.

12. The switching device according to claim 11, wherein said answering party identification data is made available upon answering of said call by said answering terminal.

13. The switching device according to claim 10, wherein said answering party identification data is made available by a terminating switching device to which said answering terminal is connected.

14. The switching device according to claim 10, wherein said calling terminal is operatively connected to an originating switching device, and wherein said at least one service control point is connected to said originating switching device.

15. The switching device according to claim 10, wherein said at least one service control point is connected to an intermediate switching device used for establishing said call.

16. The switching device according to claim 10, further comprising instructions that, when executed cause the switching device to provide at least one of said identified services associated with said answering terminal.

17. The switching device according to claim 16, wherein said identified service is provided through said at least one service control point (SCP).

18. The switching device according to claim 10, making additional answering party identification data available to said at least one service control point, based on said answering party identification data.

* * * * *